Aug. 7, 1951  F. J. FONTANA  2,562,903
CRACKING APPARATUS
Filed Oct. 25, 1945  12 Sheets-Sheet 3

INVENTOR
FRANK J. FONTANA
BY
Pennie, Davis, Marvin & Edmonds
ATTORNEYS

Aug. 7, 1951  F. J. FONTANA  2,562,903
CRACKING APPARATUS
Filed Oct. 25, 1945  12 Sheets-Sheet 4

INVENTOR
FRANK J. FONTANA
BY Pennie, Davis, Marvin & Edmonds
ATTORNEYS

Aug. 7, 1951  F. J. FONTANA  2,562,903
CRACKING APPARATUS
Filed Oct. 25, 1945  12 Sheets-Sheet 6

INVENTOR
FRANK J. FONTANA
BY
Pennie, Davis, Marvin & Edmonds
ATTORNEYS

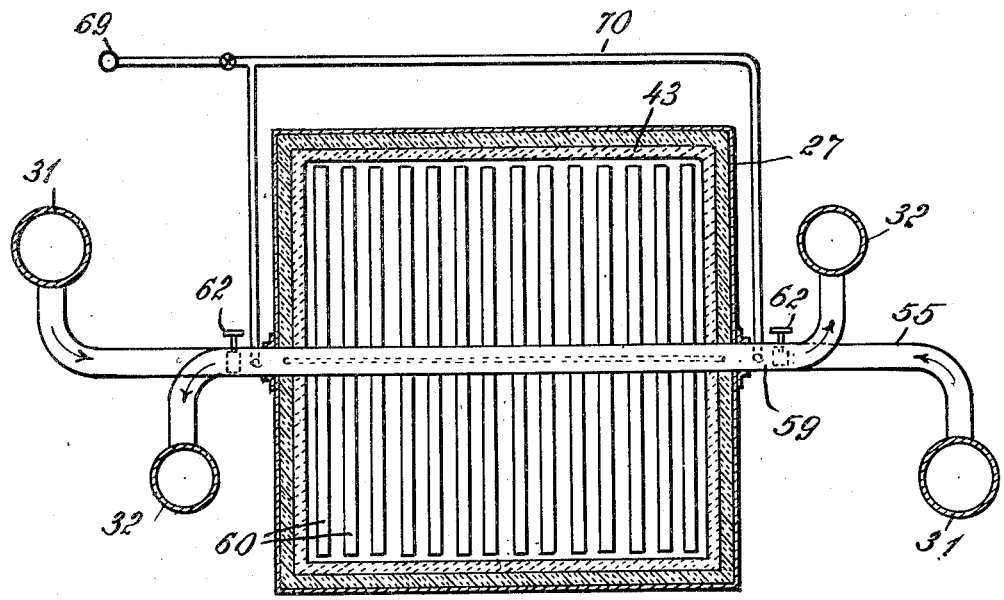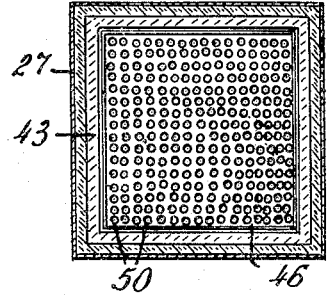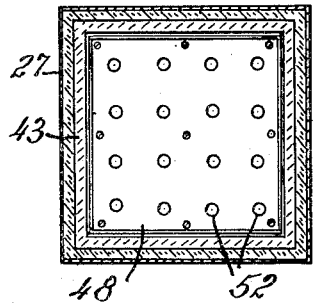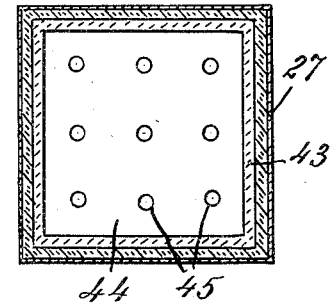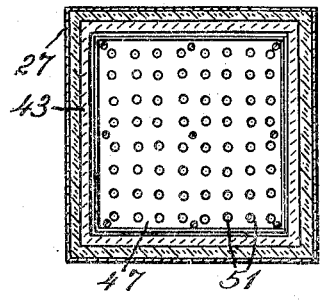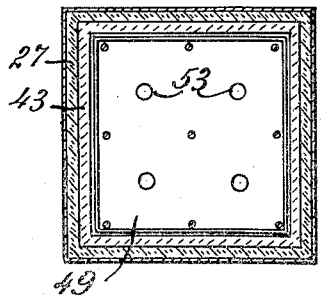

Aug. 7, 1951  F. J. FONTANA  2,562,903
CRACKING APPARATUS
Filed Oct. 25, 1945  12 Sheets-Sheet 8
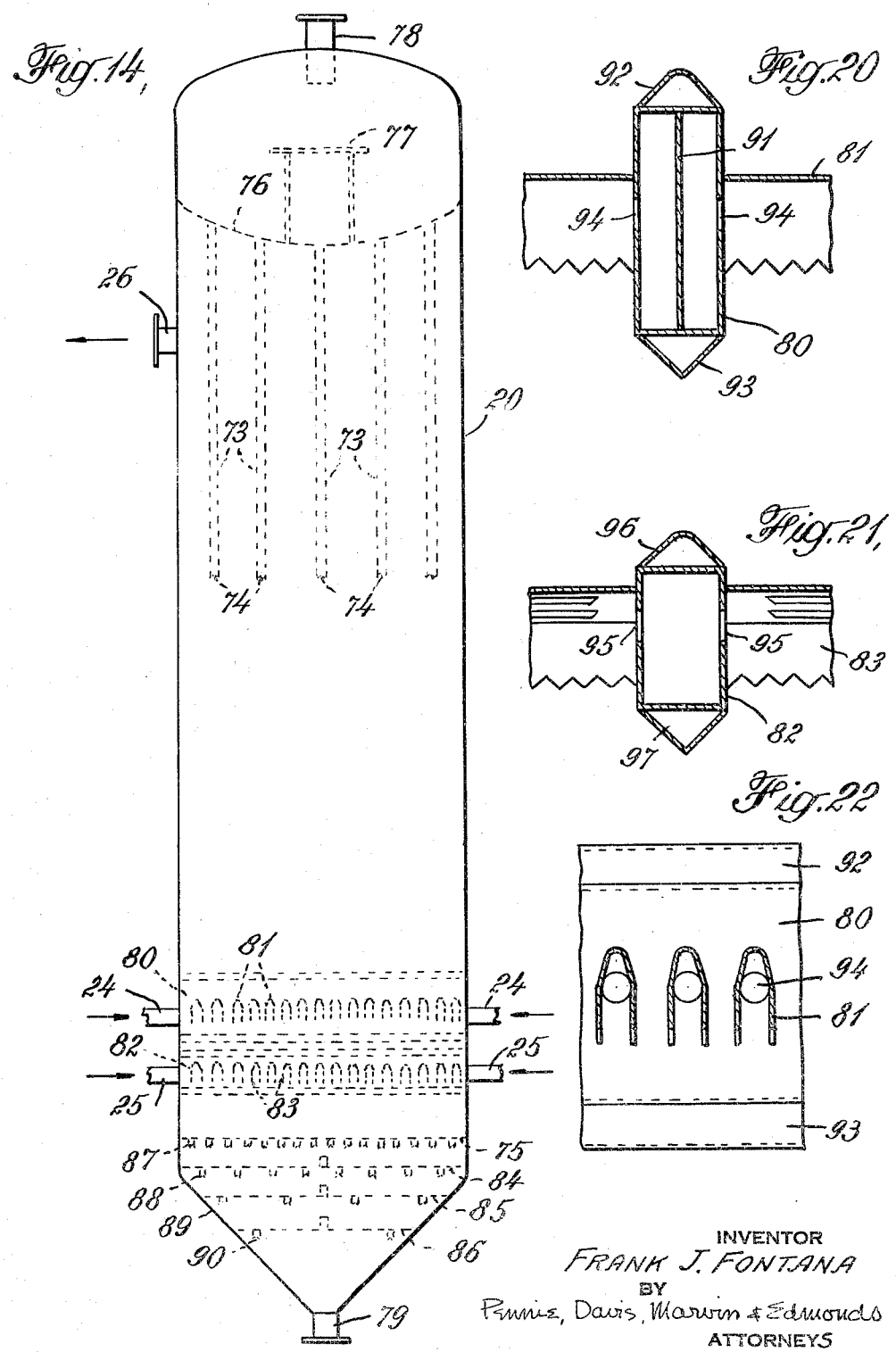
INVENTOR
FRANK J. FONTANA
BY
Pennie, Davis, Marvin & Edmonds
ATTORNEYS Aug. 7, 1951 F. J. FONTANA 2,562,903
CRACKING APPARATUS
Filed Oct. 25, 1945 12 Sheets-Sheet 9

INVENTOR
FRANK J. FONTANA
BY
Pennie, Davis, Marvin & Edmonds
ATTORNEYS

Aug. 7, 1951     F. J. FONTANA     2,562,903
CRACKING APPARATUS
Filed Oct. 25, 1945     12 Sheets-Sheet 10
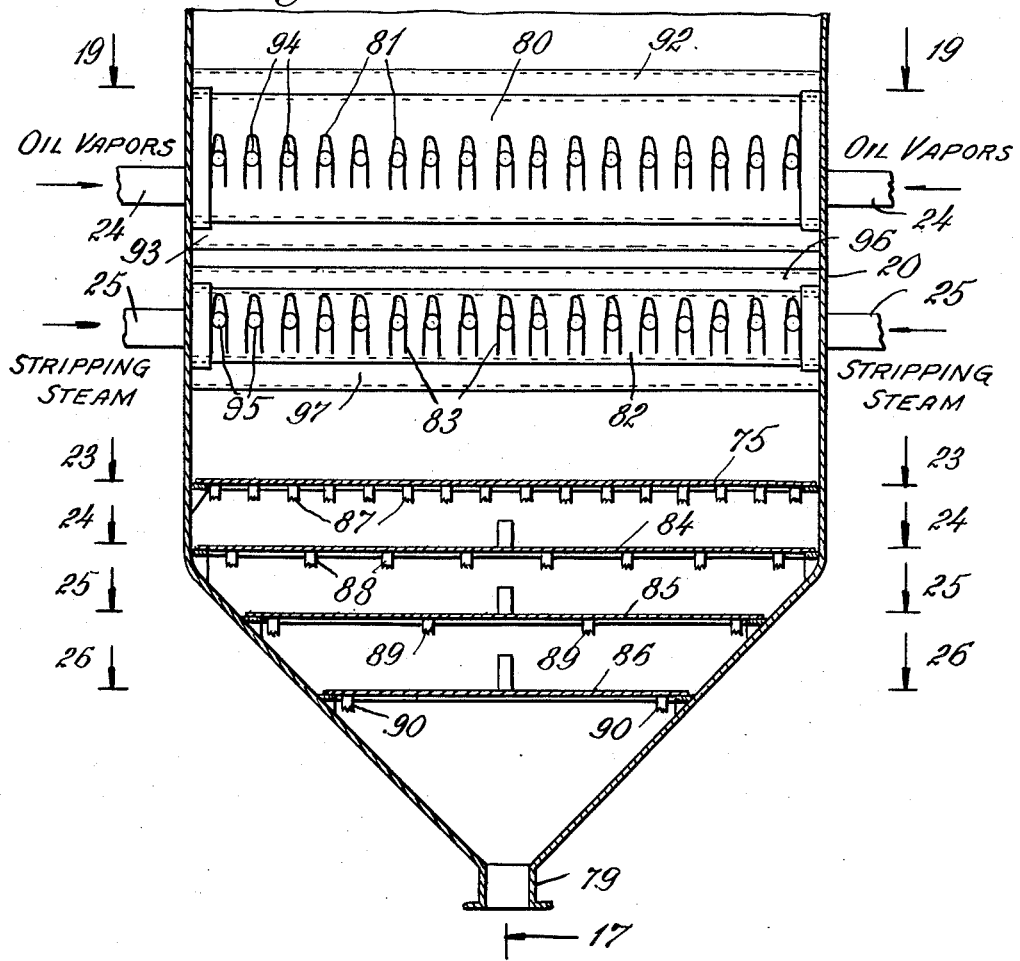
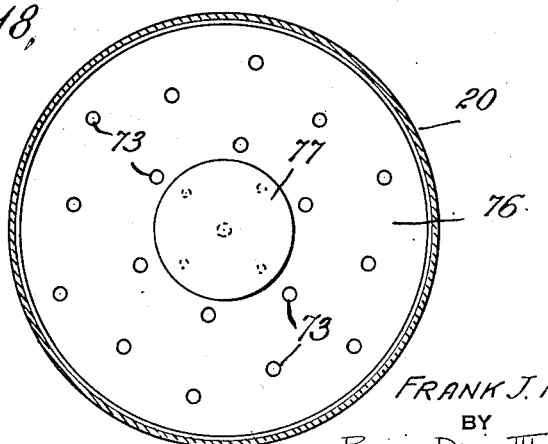
INVENTOR
FRANK J. FONTANA
BY
Pennie, Davis, Marvin & Edmonds
ATTORNEYS

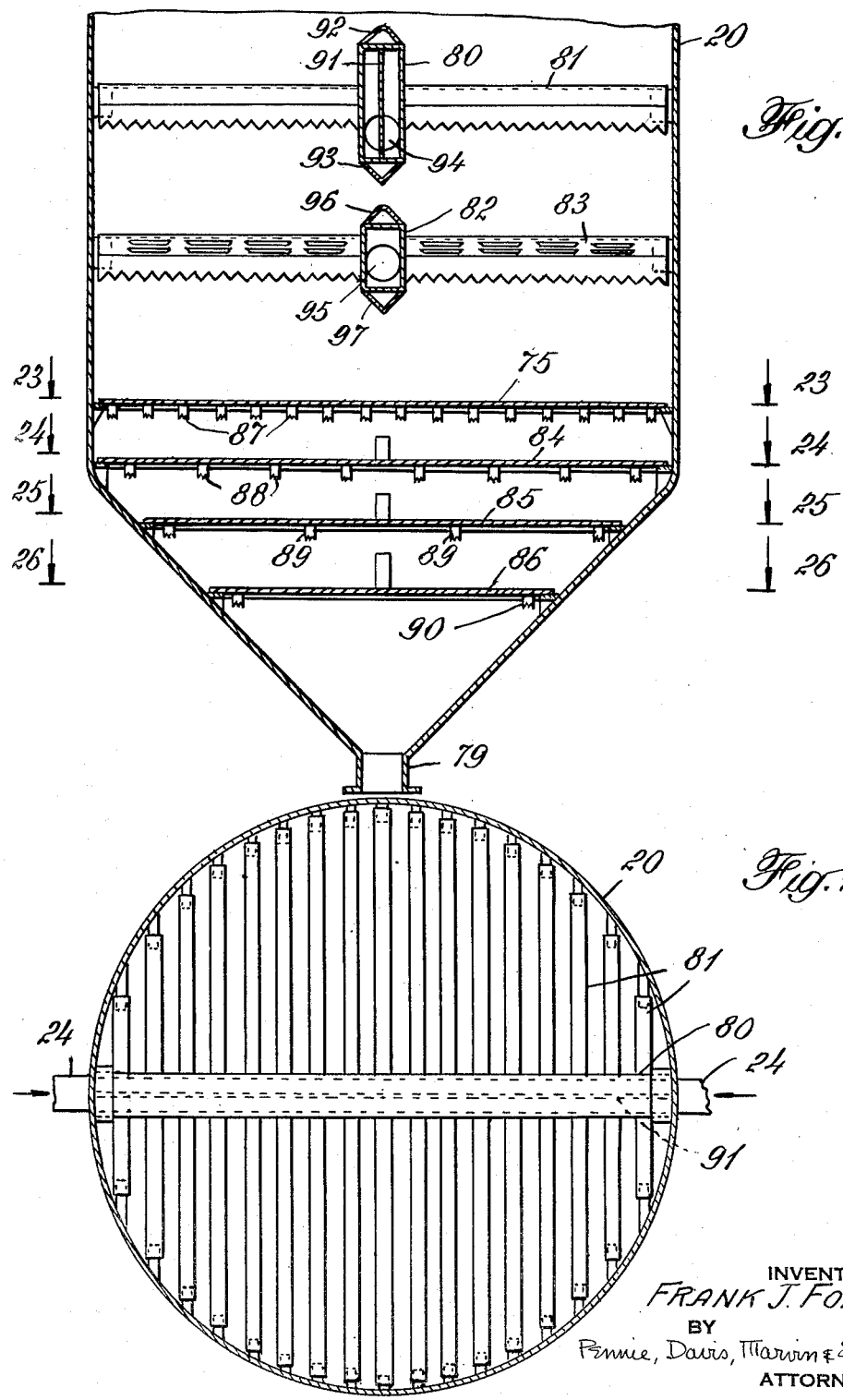

Aug. 7, 1951  F. J. FONTANA  2,562,903
CRACKING APPARATUS
Filed Oct. 25, 1945  12 Sheets-Sheet 12
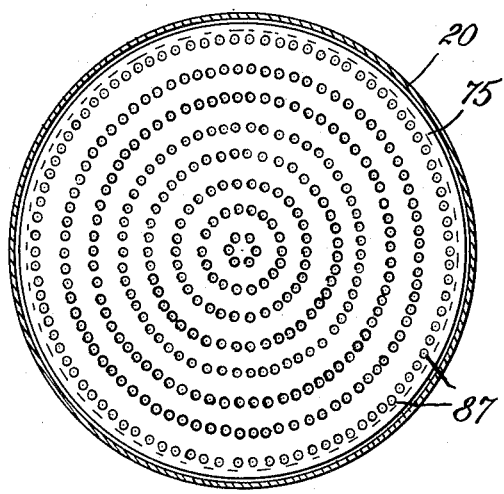
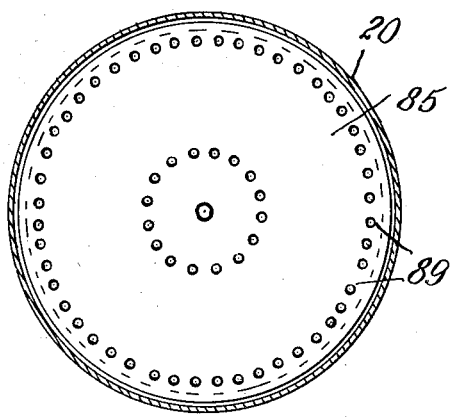
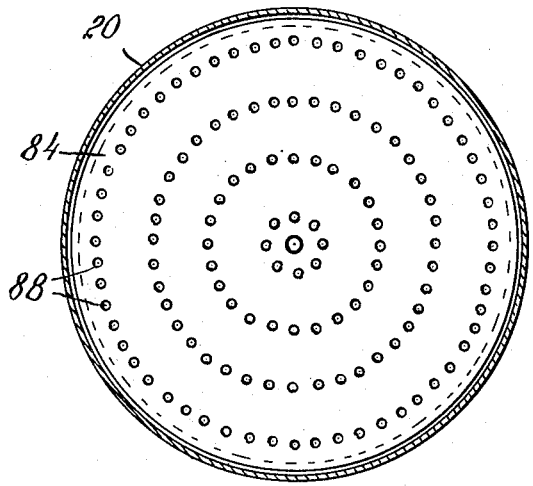
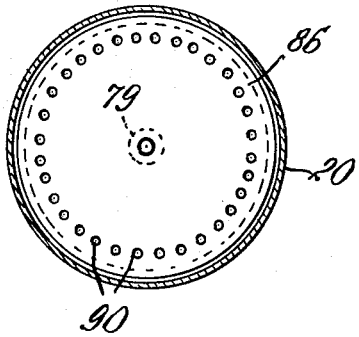
INVENTOR
FRANK J. FONTANA
BY
Pennie, Davis, Marvin & Edmonds
ATTORNEYS Patented Aug. 7, 1951

2,562,903

UNITED STATES PATENT OFFICE 2,562,903

CRACKING APPARATUS

Frank J. Fontana, Long Beach, Calif., assignor, by mesne assignments, to Houdry Process Corporation, Wilmington, Del., a corporation of Delaware Application October 25, 1945, Serial No. 624,431

4 Claims. (Cl. 23—288)

This invention relates to improvements in the catalytic cracking of hydrocarbons and more especially to improvements in cracking operations in which a granular catalyst is moved downwardly through a region of reaction in a reaction vessel, between a level of introduction and a lower level of discharge. In these operations uniform and regular flow of the granular catalyst between the two levels throughout the region of reaction is essential for maximum efficiency and economy. Thus, if the rate of catalyst flow is not uniform across the reaction vessel, i. e., if part of the catalyst flows through the region of reaction more rapidly than other parts, catalyst exposure is not uniform and catalyst efficiency drops, while if the catalyst flow is irregular the catalyst undergoes physical degradation with production of fines necessitating increased catalyst replacement. In operations in which the catalyst circulates between a cracking reactor and regenerating kiln, the effects of non-uniformity or irregularity are not confined to the reaction vessel in which it occurs. For example, non-uniform flow in the cracking reactor may involve non-uniformity of coke deposit resulting from the cracking reaction, in turn involving irregularities in the regenerating kiln in which such coke deposits are burned from the catalyst.

In the conventional catalytic cracking system employing a moving catalyst bed, uniform and regular flow of the catalyst in the cracking reactor and regenerator is sought to be attained by providing, in conjunction with catalyst distributing means in the upper part of each vessel, such means consisting of a distributing plate and associated distributing tubes, a series of apertured collector plates or baffles in the lower part of the vessel, the lowest of the baffles having the fewest apertures and each above having more than the next below, the apertures in each baffle being provided with downcomer pipes or tubes and being arranged with respect to the apertures in the next lower baffle or the discharge port in the lower end of the vessel (in the case of the lowest baffle) so that the several paths of flow through the apertures in the highest baffle are eventually gathered in a single path of flow through the discharge port. Additional to the baffles and the vertical catalyst distributing tubes, the cracking reactor and regenerating kiln each comprises a plurality of beam ducts positioned on a horizontal plane intermediate the tubes and baffles, such ducts serving for the introduction of oil vapors or steam in the case of the cracking reactor and for the introduction of air or removal of combustion gases in the instance of the regenerating kiln. Associated with each duct and extending at right angles thereto on either side on the same plane are a plurality of distributor or collector members. These members have the form of inverted troughs, and adjacent troughs form channels through which the downwardly flowing granular catalyst passes.

While it would seem that the arrangement of distributing tubes and baffles described would induce uniform and regular catalyst flow, in actual operation this desideratum hitherto has been seldom approached. One manifestation of non-uniformity and irregularity of catalyst flow is "bumping" caused by the intermittent hold-up and release of catalyst in various sections of the reaction vessel. "Bumping" is particularly pronounced during initial operation, for example, after shut-down for periodic inspection and replacement of worn parts. It may become so severe as to do serious equipment damage.

The principal object of the present invention is to provide a catalytic cracking reaction vessel, by which I mean a cracking reactor or a regenerating kiln, adapted for use in the cracking of hydrocarbon oils according to the moving catalyst bed principle, in which uniformity and regularity of catalyst flow can be established relatively sooner and can be maintained with relatively less difficulty than is possible in the now conventional reactor and regenerator.

A further object is to provide a catalytic cracking reaction vessel in which "bumping" is substantially eliminated.

The foregoing and other objects are achieved according to the present invention, which will be described with the aid of the accompanying drawings, by simple changes in the design of the catalyst distributing tubes and other parts referred to above which characterize the conventional reactor and regenerator.

In the drawings, which although diagrammatic and conventional are in general of scale proportions, Fig. 1 is a flow diagram of a cracking system comprising a regenerating kiln and cracking reactor, each embodying my invention.

Fig. 2 is an elevation of the kiln of Fig. 1.

Figs. 3 and 4 are, respectively, enlarged sections of the upper and lower parts of the kiln in Fig. 2, sections on line 3—3 of Fig. 5, and line 4—4 of Fig. 6, respectively.

Figs. 5 and 6 are, respectively, enlarged sections of the upper and lower parts of the kiln in Fig. 2, the sections being taken on line 5—5 of Fig. 3, and on line 6—6 of Fig. 4, respectively.

Fig. 7 is a section taken on line 7—7 of Fig. 3.

Fig. 8 is a fragmentary section of any of the beam ducts appearing in less detail in other figures—see particularly Figs. 5 and 6.

Fig. 9 is a reduced section taken on line 9—9 of Fig. 5.

Figs. 10 to 13 are reduced sections taken on lines 10—10, 11—11, 12—12, and 13—13 of Fig. 6.

Fig. 14 is a sectional elevation of the reactor in Fig. 1.

Fig. 16 is an enlarged section of the lower part of the reactor.

Fig. 17 is a section taken on line 17—17 of Fig. 16.

Fig. 18 is a section on line 18—18 of Fig. 15.

Fig. 19 is a section on line 19—19 of Fig. 16.

Figs. 20 and 21 are fragmentary sections of the ducts appearing in less detail in other figures—see particularly Fig. 17.

Fig. 22 is a vertical section through any three adjacent distributor troughs in the reactor.

Figs. 23 to 26 are sections taken on the lines 23—23, 24—24, 25—25 and 26—26 of Fig. 17.

Figure 1:
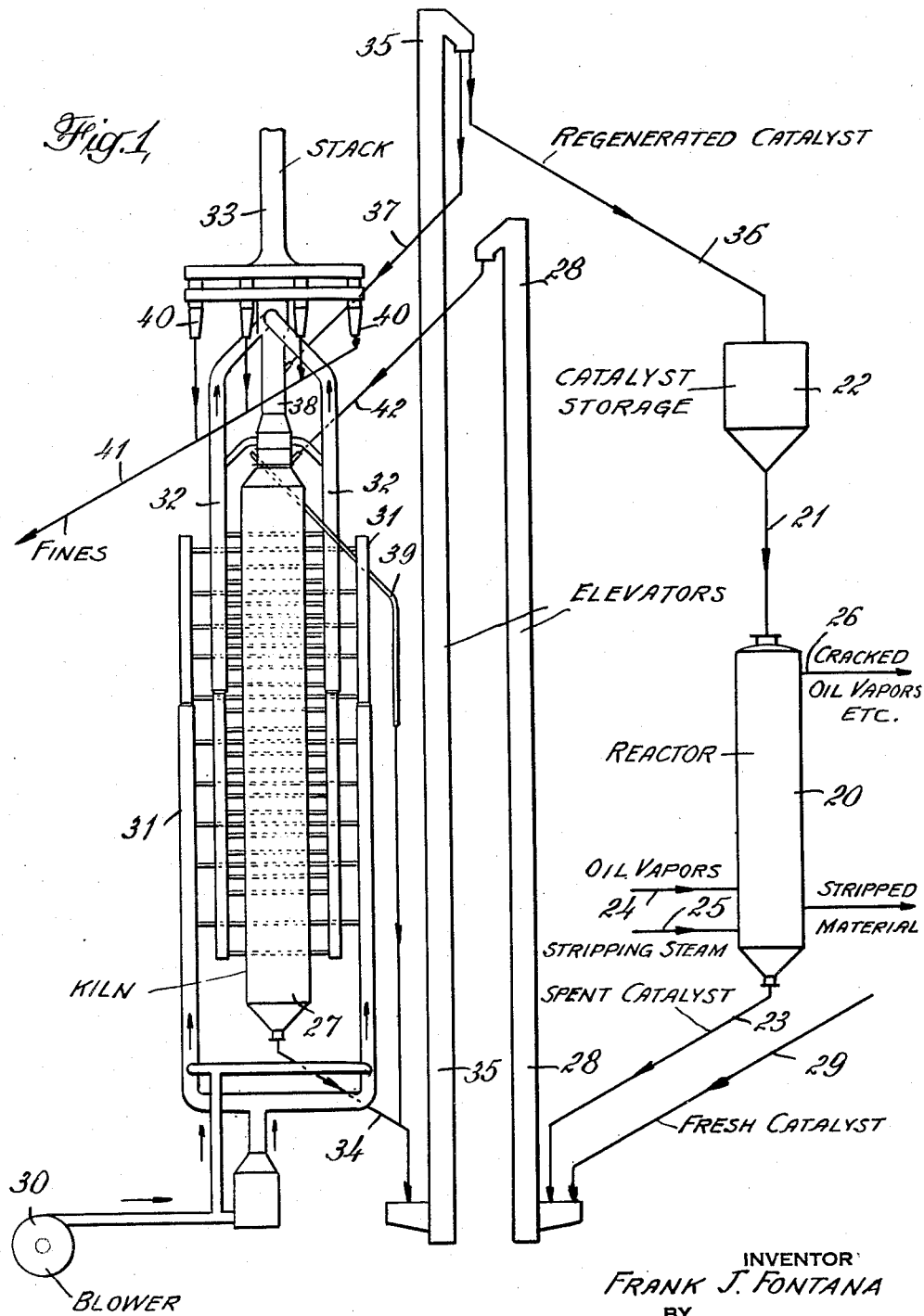

Referring to Fig. 1 as a diagram of the cracking operation as a whole: a charge of catalyst is maintained in a reactor 20, the regenerated catalyst being supplied from storage chamber 22 through connection 21 and spent catalyst being discharged through connection 23. The temperature in the reactor may approximate, for example, 900°–975° F. and the pressure in the reactor may approximate 6–10 pounds per square inch gauge. Connection 21 is made long enough to serve as a seal. The hydrocarbons to be cracked are introduced into the reactor as a vapor mixture through connection 24. Steam to strip the spent catalyst leaving the reactor of vaporizable material is introduced through connection 25. The cracked hydrocarbons together with any uncracked material and the stripping steam leave the reactor as a vapor mixture through connection 26. Spent catalyst is lifted to the top of the kiln 27 by means of bucket elevator 28, entering the kiln through connection 42. Any fresh catalyst required to maintain the volume of catalyst in circulation in the system is introduced through connection 29 and lifted to the top of the kiln 27 by means of elevator 28 together with the spent catalyst. The catalyst moves downwardly through the kiln through a series of bodies in a corresponding series of zones through which air is blown by means of blower 30 and manifolds 31 with appropriate connections to each of the several zones. The products of combustion escape from each of the several zones through ducts or manifolds 32, ultimately escaping through stack 33. The regenerated catalyst discharged from the lower end of the kiln through connection 34 is lifted to the top of bucket elevator 35. Part of the regenerated catalyst passes from the top of elevator 35 directly to chamber 22 through connection 36. Another part, 5%–10% of the total for example, passes through connection 37 to an elutriator 38. In this elutriator this diverted part of the regenerated catalyst falls through a rising stream of part of the gases passing to the stack, the fines being carried off with the gases and the coarser material returned through connection 39 to the foot of the elevator 35. In this manner the proportion of fines in the circulating catalyst can be kept within a chosen maximum. As a control, the proportion of the stack gases diverted through the elutriator can be varied or the proportion of the regenerated catalyst diverted to the elutriator can be varied. Before escaping through the stack 33 the products of combustion pass through a series of cyclone separators 40 in which fines carried out of the elutriator together with any fines carried out of the kiln proper are separated and discharged through connection 41. The kiln, the catalyst storage chamber, the reactor, the elevators and the several connections through which the catalyst passes are thermally insulated to minimize heat loss. By passing fresh catalyst through the kiln as it enters the system, such fresh catalyst is brought to the same temperature as the bulk of the circulating catalyst before it enters the catalyst storage chamber or the reactor.

Figure 4:
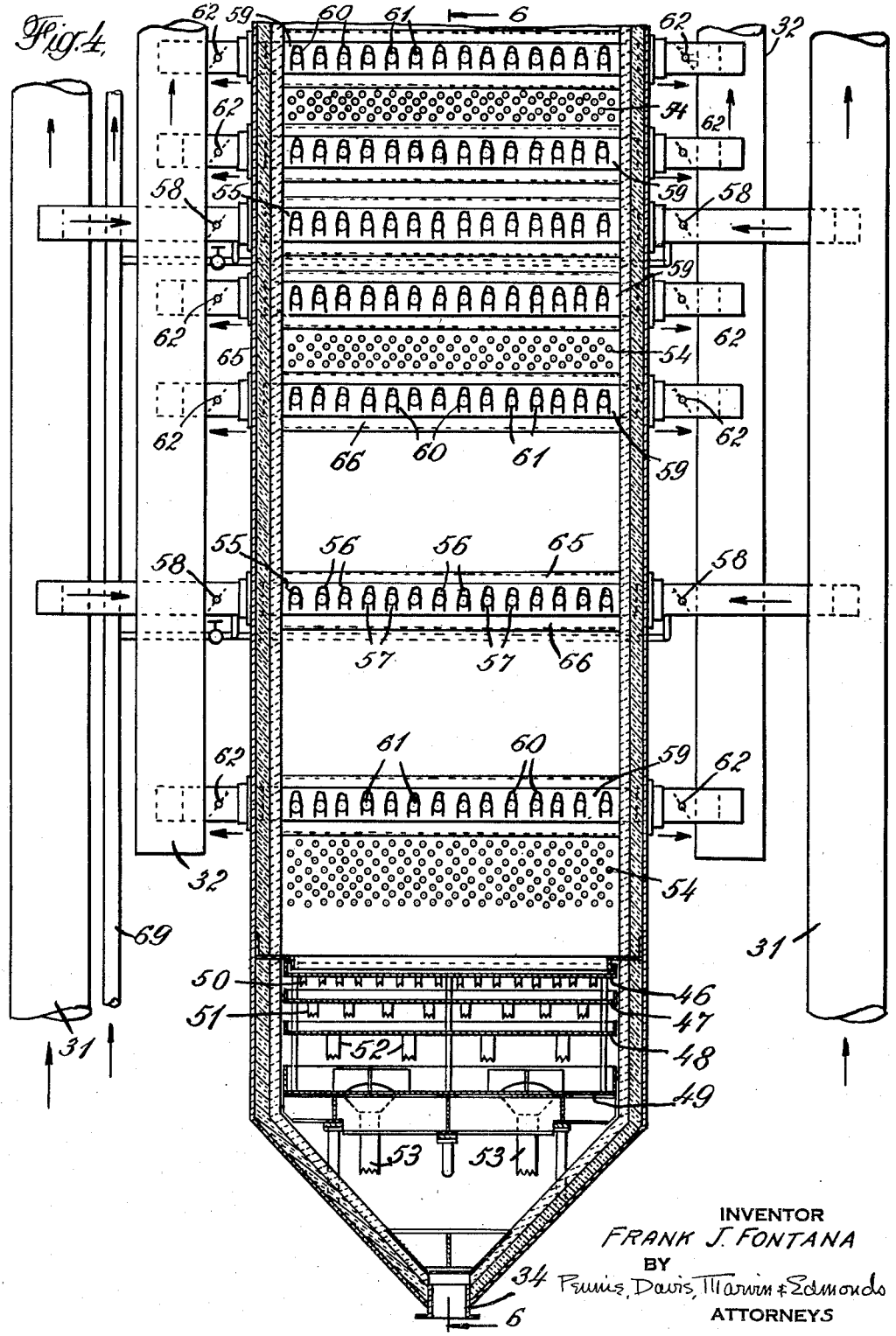
Figure 5:
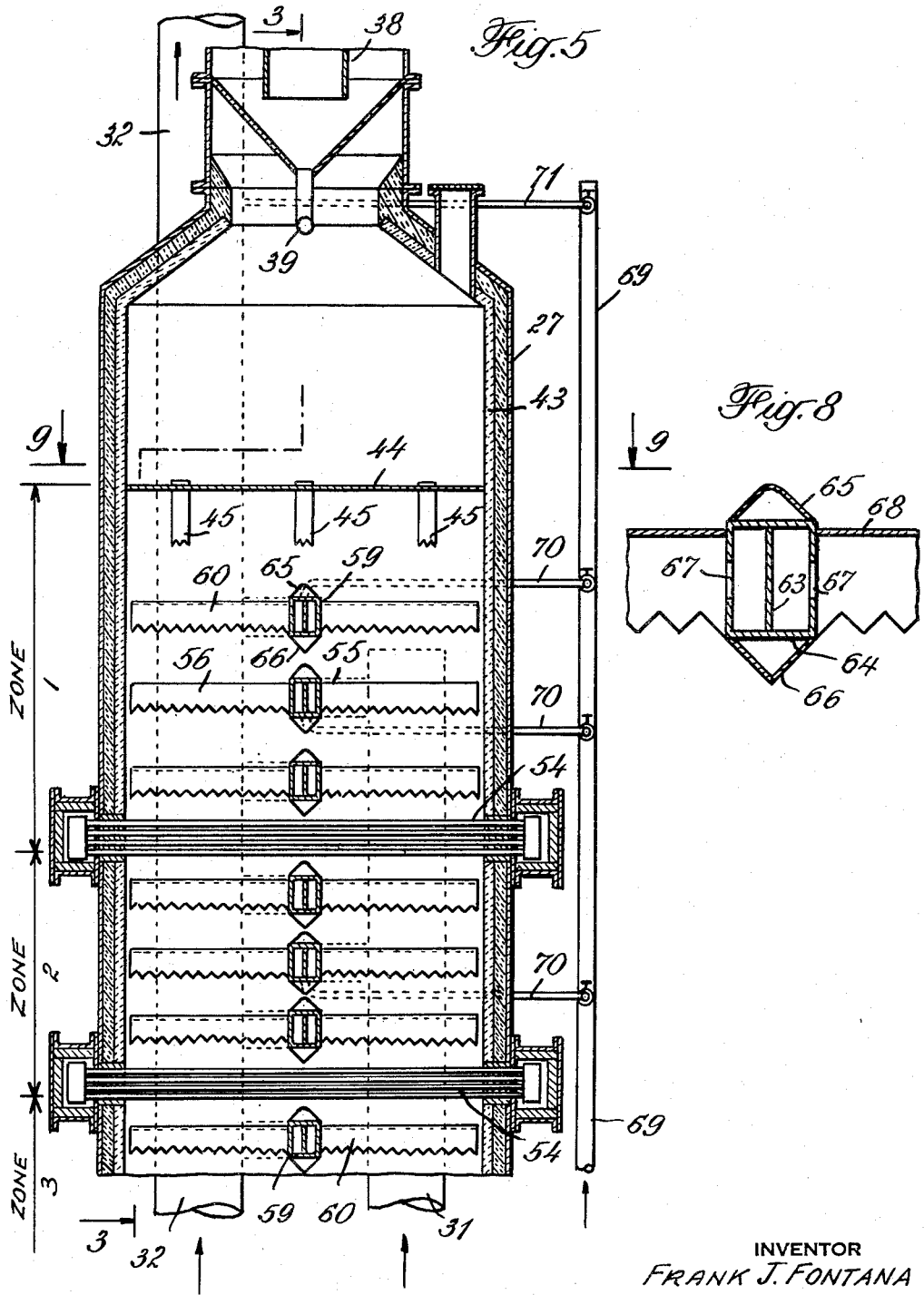
Figure 6:
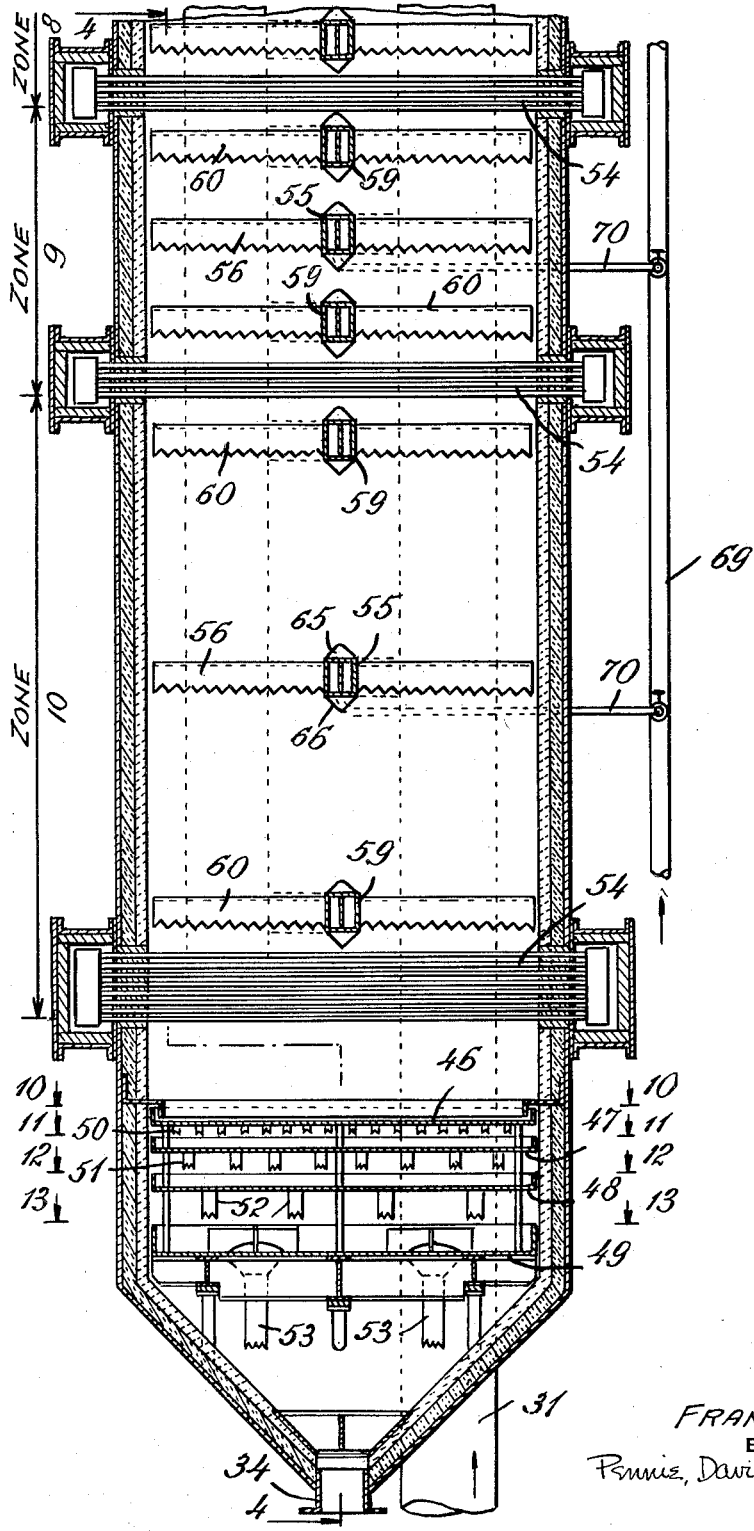

Referring now to Figs. 2 to 13, illustrating in greater detail a regenerating kiln embodying my invention: the kiln comprises a rectangular, thermally-insulated, and refractory-lined shell 43. To effect uniform distribution of the catalyst over a horizontal section of the kiln, a distributor plate or baffle 44, carrying distributing tubes 45, is arranged at the upper end of the kiln. To promote uniform flow of the catalyst downwardly through the kiln, a series of collector plates or baffles 46, 47, 48, and 49, each carrying appropriately arranged distributing tubes or downcomers 50, 51, 52, and 53, is provided in the lower part of the kiln. The arrangement of the apertures in the collector plates 46, 47, 48, and 49 is detailed in Figs. 10, 11, 12, and 13, respectively, while a plan view of the distributor plate 44, from which the tubes 45 depend, is provided by Fig. 9. As indicated by these figures, the distributor plate preferably supports at least 9 tubes; plate 46, 256 tubes; plate 47, 64 tubes; plate 48, 16 tubes, and plate 49, 4 tubes. With respect to plates 46—49, it is to be noted that the diameter and length of the tubes increases with each succeeding plate. A plurality of tube bundles 54, through which a cooling medium is circulated, divides the regenerator into 10 zones (see Fig. 2), each of which is independent of the others for control purposes. A grid consisting of a beam duct 55 and associated distributor troughs 56 is arranged centrally of each zone for introduction of air thereinto (see Figs. 3–6). Each of beam ducts 55 comprises apertures 57 allowing for passage of air from the duct to its associated distributor troughs, the air being supplied from manifolds 31 connected to the ducts through dampers 58. For the collection of flue gases there is provided in each zone two grids, one below and one above the grid for air introduction, each of which like the grid for air introduction composes a beam duct 59 and associated troughs 60 communicating through passageways 61. Beam ducts 59 communicate with flue gas manifolds 32 through dampers 61. A plan view of one of the grids for removing flue gases is provided by Fig. 7. In Fig. 8, illustrating in greater detail any of the beam ducts as shown in Figs. 5 and 6, the numeral 63 denotes a reinforcing web extending throughout the length of the beam duct, indicated generally by the numeral 64. Attached, or integral, peaked portions 65 and 66, effectively streamline the duct on a vertical plane, while passageways 67 allow for entry of air into the trough 68, or for escape of flue gas from the trough, as the case may be.

Figure 2:
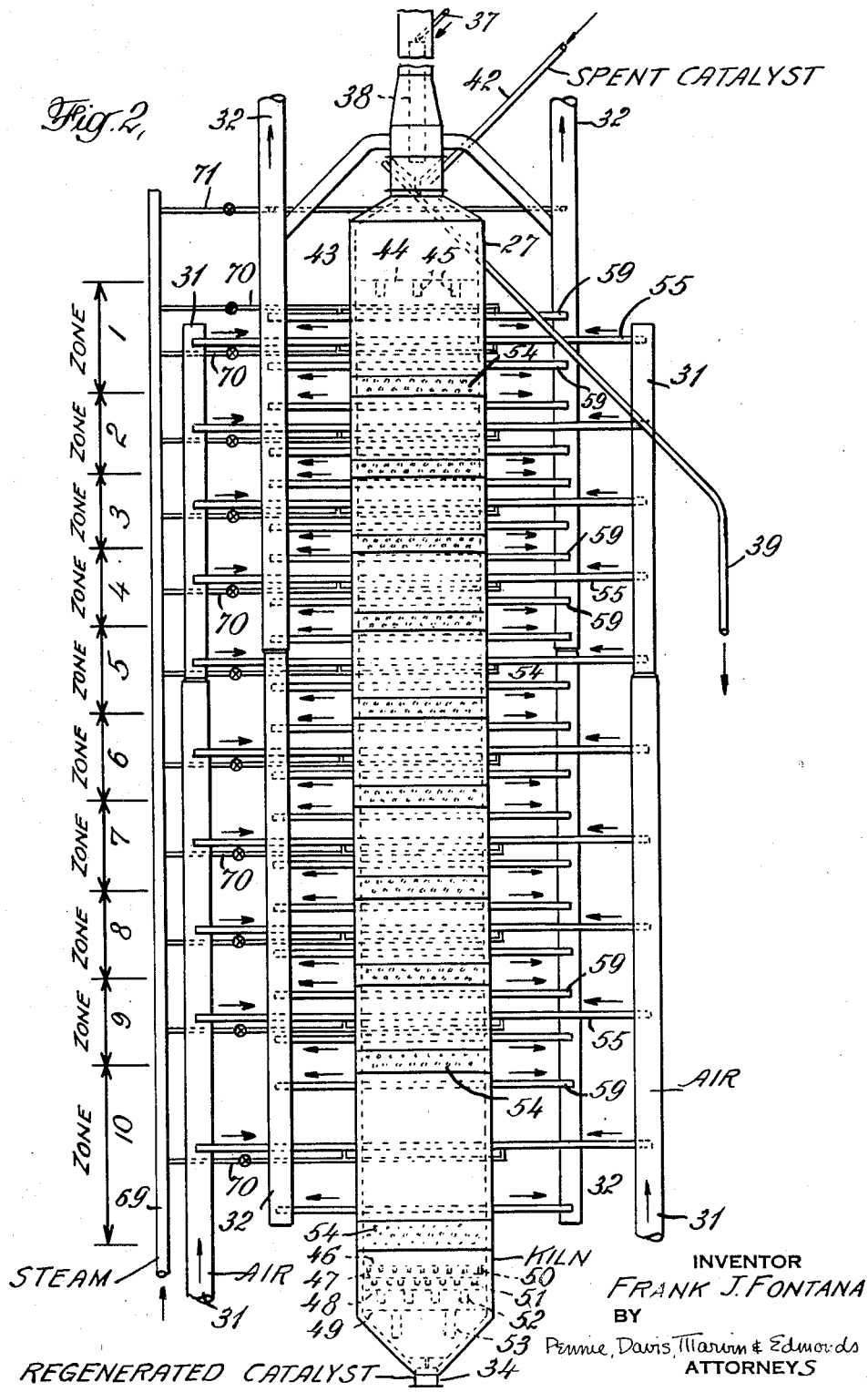
Figure 3:
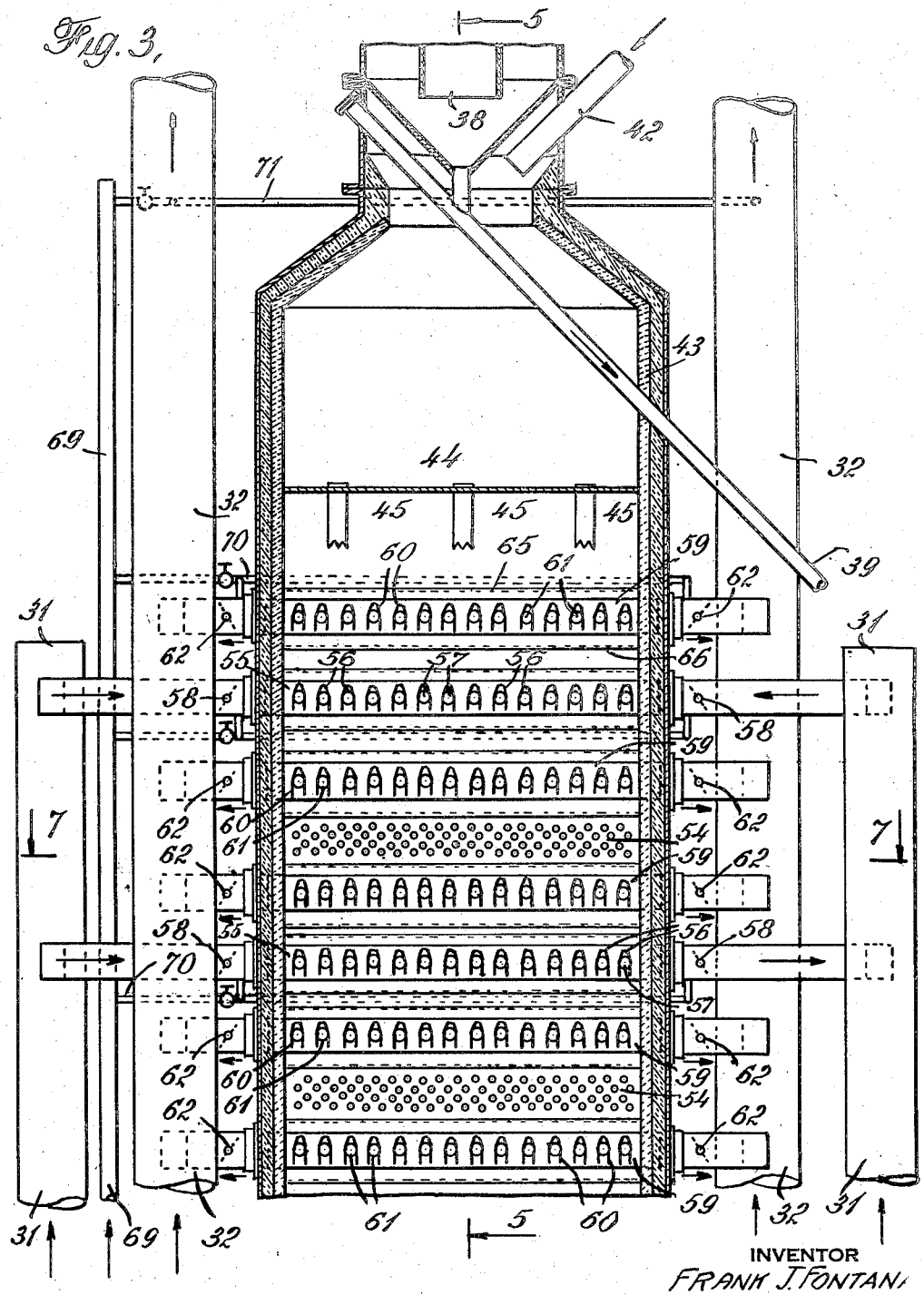

It will be noted from Figs. 2, 4, or 6 that in the zone nearest the bottom of the regenerating kiln, i. e. zone 10, the flue gas collector troughs are spaced further from the air distributor troughs than in the other zones, and also, that in operation of the kiln the body of catalyst in this one is larger than in the other zones. In all other respects, however, such zone is identical with the other zones. Valved connections are provided for introducing steam from manifold 69 into the distributing troughs in each of the 10 zones as may be required. Valved connections (70 and 71) are also provided for introduction of steam from manifold 69 into the uppermost collecting troughs in zone 1, and into the stack manifolds 32. The steam from manifold 69 may serve as a cooling agent, for example, or in an emergency as a smothering agent.

I have found that "bumping" in the regenerator is to a large extent eliminated by the streamlining of the beam ducts in the manner indicated by Fig. 8. Such streamlining, which in effect divides the kiln into two halves, also halts undesirable cascading caused by catalyst flow around the beam ducts and tends to prevent short-circuiting of air-flow through dead catalyst space, i. e. space free of catalyst, between beam ducts.

The serrated edges of the distributor troughs 56 and the collector troughs 60 (see Figs. 5, 6 and 8), I have discovered, materially reduce intermittent hold-up and release of catalyst in the channels formed by adjacent troughs and thus contribute greatly toward uniformity and regularity of catalyst flow downwardly through the regenerator, and toward elimination of "bumping" due to pulsating flow. Still further improvement in regularity and uniformity of catalyst flow results from the serrations at the ends of the distributing tubes 45 associated with plate 44, and at the ends of distributing tubes 50, 51, 52, and 53 associated respectively with collector baffles or plates 46, 47, 48, and 49. Catalyst flow through these tubes is much smoother than catalyst flow through ordinary tubes such as have been heretofore employed. If desired, serrations may be provided at the upper ends of tubes 45, which pass through plate 44; also, at the upper ends of the distributing tubes associated with the collector baffles when these extend through the baffles. It is not essential that all of the grids for removing flue gases comprise serrated troughs, in fact it may be considered desirable from the standpoint of reducing loss of catalyst in the flue gas to substitute ordinary grids with straight edged troughs in some of the zones, particularly zones 4 to 10.

Figure 15:
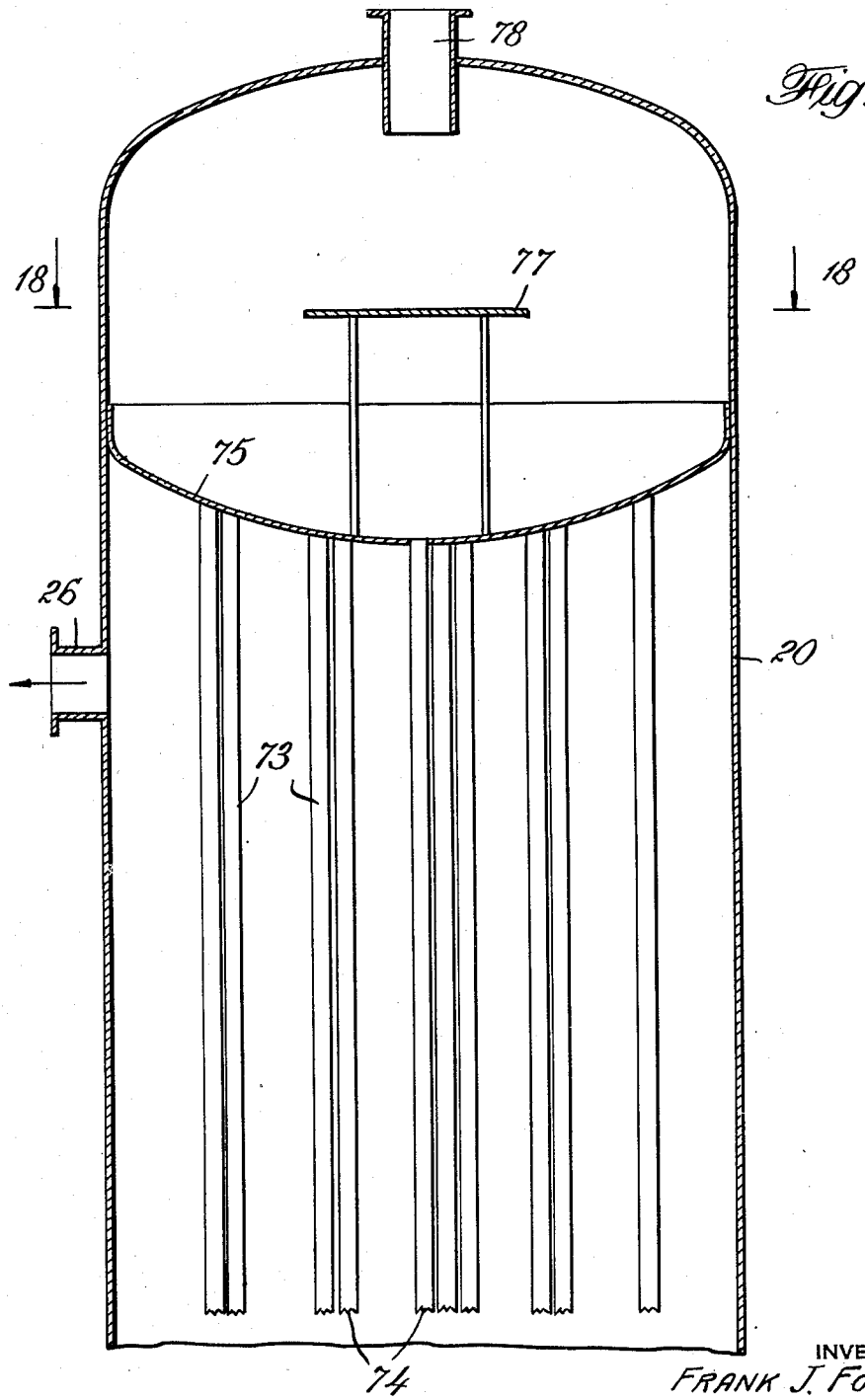
Fig. 15 is an enlarged section of the upper part of the reactor.

Referring to Figs. 14 to 26 as an illustration of a cracking reactor embodying my invention: the reactor comprises a cylindrical casing, as shown. Fresh catalyst or regenerated catalyst or a mixture of the two is charged into the upper end of the reactor from line 21 (see Fig. 1) and spent catalyst is discharged from the lower end of the reactor through line 23, the reactor being maintained substantially full of catalyst between the lower ends of the distributing tubes 73 having serrated ends 74 (Figs. 14, 15, and 18) and the uppermost of the collector baffles, baffle 75, in the lower part of the reactor. A partition 76 separates the catalyst charging chamber in the upper part of the reactor from that region in the vessel in which the hydrocarbons to be cracked pass in contact with the catalyst. A baffle 77 beneath the discharge of connection 78 spreads the entering catalyst over this partition. The catalyst then flows through the serrated distributing tubes 73 into the region of reaction. As the charge of catalyst in the reactor, as the result of discharge through connection 79, moves away from the lower ends of these distributing tubes 73, additional catalyst immediately flows through the tubes keeping the lower ends of the tubes covered, the charge of catalyst in the reactor thus being automatically maintained. The distributing tubes 73 also assist in preventing the escape of hydrocarbons through the catalyst supply connections and provide free space above the charge of catalyst in the reactor for separation of any catalyst material entrained in the vapors. The hydrocarbons to be cracked are introduced into the reactor as a vapor mixture through connection 24, the beam duct 80 and its associated distributor troughs 81 (see Figs. 16 and 17). Steam to strip the spent catalyst leaving the reactor of vaporizable material is introduced through connection 25, beam duct 82 and distributor troughs 83. Troughs 81 and 83 will be seen as provided with serrated edges. The cracked hydrocarbons together with any uncracked material and the stripping steam leave the reactor as a vapor mixture through connection 26. To promote uniform flow of the catalyst downwardly through the reactor, a series of collector baffles, including baffle 75, already mentioned supra, and baffles 84, 85, and 86, is provided in the lower part of the reactor. The arrangement on the baffles of the apertures corresponding to the distributing tubes 87, 88, 89, and 90 is shown by Figs. 23, 24, 25, and 26, respectively. These distributing tubes, like the distributing tubes associated with the collector baffles 46, 47, 48, and 49 in the regenerator, have serrated ends.

It will be noted, as from Fig. 20, that the duct for oil vapor introduction, duct 80, like the beam ducts in the regenerator, comprises a supporting web 91 and attachments or integrated peaked portions 92 and 93 which effectively streamline the duct on a vertical plane. Flow of oil vapor to the serrated distributor trough 81 is through passageways 94. Similar passageways 95 are provided in the beam duct 82 (Fig. 21) comprising attachments or integral portions 96 and 97 and through which steam is introduced into the reactor. Serrated distributor troughs 83, communicating with beam duct 82 through passageways 95 are preferably louvered as shown. Fig. 22 may be considered as illustrating in vertical cross section any three adjacent distributor or collector troughs in the regenerator, as well as any three adjacent oil vapor distributor troughs in the reactor. The reference characters in this figure conform with those in Fig. 20, since the two figures are drawn to the same scale.

Substantial elimination of pulsating catalyst flow and of "bumping" in the reactor obtains as a consequence of the serrations at the lower ends of the distributing tubes 73 and 87—90 and along the edges of the distributor troughs 81 and 83. Serrated troughs, of course, may be used with ordinary tubes, that is, with tubes the lower ends of which are not serrated, with considerable improvement. Conversely, serrated tubes may be employed in combination with ordinary straight-edged troughs, likewise with considerable improvement.

By the expression "aeriform fluid" as used herein I mean to embrace air and substances having the form or nature of air, e. g. the steam admitted to the reactor to strip the catalyst of hydrocarbons, the vaporized oil charged to the reactor, the air introduced into the regenerator and the flue gases withdrawn therefrom.

I claim:

1. The combination in a catalytic cracking reaction vessel provided with a port for introduction of granular catalyst at its upper end and a port for catalyst discharge at its lower end, of a horizontal plate for receiving catalyst admitted through the first port, vertical catalyst distributing conduits depending from the plate having serrations at their lower ends, a vertical series of horizontal baffles above the catalyst discharge port, each baffle in the series supporting depending vertical conduits for catalyst distribution having serrations at their lower ends, a horizontally disposed duct for the introduction of an aeriform fluid positioned mediate the serrated lower ends of the first-mentioned conduits and the uppermost baffle of said series of baffles, the duct having peaked bottom and top portions effectively streamlining it on a vertical plane, and distributor members having the form of inverted troughs communicating with the duct through apertures therein and extending substantially at right angles thereto on the same plane and level, the lower edges of the sides of said members being serrated.

2. In a catalytic cracking reactor having a port for the withdrawal of cracked products, a port for introduction of granular catalyts and a port for catalyst discharge, the port for cracked products withdrawal and the port for catalyst introduction being positioned at the upper end of the reactor, the port for catalyst discharge being positioned at the lower end of the reactor, a horizontal disposed catalyst distributing baffle below the port for catalyst introduction, a plate below the baffle for receiving catalyst from the baffle, vertical catalyst distributing conduits depending from the plate having serrations at their lower ends, a vertical series of horizontal baffles above the catalyst discharge port, each baffle in the series supporting depending vertical conduits for catalyst distribution having serrations at their lower ends, a horizontally disposed duct for the introduction of oil vapor positioned mediate the serrated lower ends of the first-mentioned conduits and the uppermost baffle of said series of baffles, the duct having peaked bottom and top portions effectively streamlining it on a vertical plane, distributor members having the form of inverted troughs extending outwardly from the sides of the duct, the lower edges of the sides of said members being serrated, a second horizontally disposed duct for the introduction of steam positioned below the first-mentioned duct and above the uppermost baffle of said series of baffles, the duct having peaked bottom and top portions effectively streamlining it on a vertical plane, and distributor members having the form of inverted troughs extending outwardly from the sides of the duct, the lower edges of the sides of said members being serrated.

3. The combination in a catalyst regenerating kiln provided with a port for introduction of granular catalyst at its upper end and a port for catalyst discharge at its lower end of a horizontally disposed plate for receiving catalyst from the first port, vertical catalyst distributing conduits depending from the plate having serrations at their lower ends, a vertical series of horizontal baffles above the catalyst discharge port, each baffle in the series supporting depending vertical conduits for catalyst distribution having serrations at their lower ends, a plurality of pairs of horizontally disposed ducts for the removal of flue gases positioned mediate the serrated lower ends of the first-mentioned conduits and the uppermost baffle of said series of baffles, such ducts having peaked bottom and top portions effectively streamlining them on a vertical plane, collector members having the form of inverted troughs extending outwardly from the sides of each duct, the lower edges of the sides of said members being serrated, a horizontally disposed duct for the introduction of air between each pair of ducts for flue gas removal, the duct having peaked bottom and top portions effectively streamlining it on a vertical plane, and distributor members having the form of inverted troughs extending outwardly from the sides of the duct, the lower edges of the sides of said members being serrated.

4. In a reaction vessel comprising a chamber adapted to contain a downwardly moving non-turbulent bed of fluent granular solid, a port for introduction of granular solid at its upper end and a port for discharge of granular solid at its lower end: the combination thereof with a horizontal partition below the solid introduction port and above said bed; downwardly directed solid distributing conduits depending from said partition, said solid distributing conduits being open at both ends and having serrations at their lower ends; a vertical series of horizontal baffles above the solid discharge port; open ended vertical conduits depending from each baffle in the series, each of said vertical conduits having serrations at its lower end, and means for passing gas between the exterior and the interior of said vessel comprising at least one plurality of gas passage members having the form of inverted troughs, said members being spaced apart in parallel relation in a horizontal plane, the lower edges of the sides of said members being serrated.

FRANK J. FONTANA.

REFERENCES CITED

The following references are of record in the file of this patent:

UNITED STATES PATENTS

| Number | Name | Date |
|---|---|---|
| 1,240,215 | Hunt | Sept. 18, 1917 |
| 2,183,301 | Bossner et al. | Dec. 12, 1939 |
| 2,362,621 | Fahnestock | Nov. 14, 1944 |
| 2,412,136 | Evans et al. | Dec. 3, 1946 |
| 2,418,673 | Sinclair et al. | Apr. 8, 1947 |
| 2,423,411 | Simpson | July 1, 1947 |
| 2,458,359 | Evans | Jan. 4, 1949 |

Certificate of Correction

Patent No. 2,562,903                                      August 7, 1951

FRANK J. FONTANA

It is hereby certified that error appears in the printed specification of the above numbered patent requiring correction as follows:

Column 4, line 57, for "composes" read *comprises*; line 60, for "61" read *62*; column 5, line 2, for "one" read *zone*; column 7, lines 30 and 31, for "horizontal" read *horizontally*;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*